United States Patent
Friese et al.

(10) Patent No.: US 8,569,526 B2
(45) Date of Patent: Oct. 29, 2013

(54) METHOD FOR CARRYING OUT OXIDATION REACTIONS USING INDUCTIVELY HEATED HEATING MEDIUM

(75) Inventors: Carsten Friese, Duesseldorf (DE); Andreas Kirschning, Celle (DE); Sascha Volkan Ceylan, Hannover (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/210,677

(22) Filed: Aug. 16, 2011

(65) Prior Publication Data

US 2011/0301363 A1  Dec. 8, 2011

Related U.S. Application Data

(63) Continuation of application No. PCT/EP2009/062959, filed on Oct. 6, 2009.

(51) Int. Cl.
*C07D 301/12* (2006.01)
*C07D 311/30* (2006.01)
*C07D 311/76* (2006.01)
*C07C 45/28* (2006.01)
*C07C 45/29* (2006.01)

(52) U.S. Cl.
USPC ........... 549/531; 549/290; 549/403; 568/309; 568/322; 568/423

(58) Field of Classification Search
USPC .......... 549/303, 290, 403, 531; 568/309, 322, 568/423
See application file for complete search history.

(56) References Cited

U.S. PATENT DOCUMENTS

| 5,110,996 | A | | 5/1992 | Edwards |
| 5,645,808 | A | * | 7/1997 | Krause .................... 423/245.3 |

FOREIGN PATENT DOCUMENTS

| DE | 19800294 A1 | 7/1999 |
| DE | 10140089 A1 | 2/2003 |
| DE | 102005051637 A1 | 5/2007 |
| DE | 102008040451 A1 | 1/2010 |
| EP | 1592284 A1 | 11/2005 |
| WO | 9521126 A1 | 8/1995 |
| WO | 0038831 A1 | 7/2000 |
| WO | 03042315 A1 | 5/2003 |
| WO | 03054102 A1 | 7/2003 |
| WO | 2010002751 A2 | 1/2010 |

OTHER PUBLICATIONS

Ceylan et al, Angewandte Chem. Int. Ed., vol. 47, p. 8950-8953 (2008).*
International Search Report for PCT/EP2009/062959, dated Mar. 26, 2010, 6 pages.
"Magnetische Nanopartikel: Synthese, Stabilisierung, Funktionalisierung und Anwendung", by An-Hui Lu, Elena Lorena Salabas and Ferdi Schuth; Angew. Chem. 2007, vol. 119, pp. 1242-1266.

* cited by examiner

*Primary Examiner* — Bernard Dentz
(74) *Attorney, Agent, or Firm* — Mary K. Cameron

(57) ABSTRACT

The invention relates to a method for carrying out an oxidation reaction for producing a product by heating a reaction medium containing a reactant and oxygen or an oxygen carrier in a reactor, wherein the reaction medium is brought into contact with a solid heating medium which may be heated by electromagnetic induction, which is surrounded by the reaction medium. The heating medium is heated by electromagnetic induction using an inductor, wherein an oxidation reaction is carried out on the first reactant to give a product and the product is separated from the heating medium. The inductor preferably generates an alternating field with a frequency in the range 1 to 100 kHz, preferably in the range 10 to 80 kHz and in particular up to 50 kHz.

19 Claims, No Drawings

METHOD FOR CARRYING OUT OXIDATION REACTIONS USING INDUCTIVELY HEATED HEATING MEDIUM

CROSS-REFERENCE TO RELATED APPLICATIONS

This application is a continuation under 35 U.S.C. Section 365(c) and 120 of International Application No. PCT/EP2009/062959, filed Oct. 6, 2009 and published on Aug. 19, 2010 as WO 2010/091747 A1, which claims priority from German Patent Application No. 10 2009 000 889.6 filed Feb. 16, 2009, which are incorporated herein by reference in their entirety.

The present invention is in the field of chemical synthesis and relates to a process for carrying out an oxidation reaction with the help of an inductively heated heating medium.

In order to carry out thermally inducible chemical reactions, various techniques are known for heating the reactants. Heating by thermal conduction is the most widely used. Here the reactants are present in a reactor, wherein either the walls of the reactor are themselves heated or wherein heat-transfer elements, such as for example heating coils or heat exchanger pipes or plates, are built into the reactor. This process is comparatively slow, so that firstly the reactants are heated slowly and secondly the heat input cannot be rapidly suppressed or even compensated for by cooling. An alternative to this consists in heating the reactants by irradiating microwaves into the reactants themselves or in a medium that contains the reactants. However, microwave generators represent a considerable safety risk as they are technically costly and the danger exists for the leakage of radiation.

In contrast to this, the present invention provides a process, in which the reaction medium is heated by bringing it into contact with a heating medium that can be heated by electromagnetic induction and which is heated "from the exterior" by electromagnetic induction with the aid of an inductor.

The process of inductive heating has been used for some time in industry. The most frequent applications are melting, curing, sintering and the heat treatment of alloys. However, processes such as gluing, shrinking or bonding of components are also known applications of this heating technology.

Processes for the isolation and analysis of biomolecules are known from the German patent application DE 198 00 294, wherein the biomolecules are bonded onto the surface of inductively heatable magnetic particles. This document states: "The principle of operation consists in adsorptively or covalently binding biomolecules to the surface of a functional polymer matrix, in which the inductively heatable magnetic colloids or finely dispersed magnetic particles are encapsulated, said biomolecules being capable of binding analytes such as e.g. DNA/RNA sequences, antibodies, antigens, proteins, cells, bacteria, viruses or fungal spores according to the complementary affinity principle. Once the analytes have been bound to the matrix the magnetic particles can be heated in a high frequency magnetic alternating field to temperatures of preferably 40 to 120° C. that are relevant for analysis, diagnostics and therapy." Furthermore, this document treats the technical design of rinsing systems and high frequency generators, which can be used in this process. The cited document thus describes the use of inductively heatable particles for the analysis of complex biological systems or biomolecules.

DE 10 2005 051637 describes a reactor system with a micro-structured reactor as well as a process for carrying out a chemical reaction in such a reactor. Here the reactor as such is heated by electromagnetic induction. The heat transfer into the reaction medium results through the heated reactor walls. On the one hand this limits the size of the surface that is available for heating the reaction medium. On the other hand, parts of the reactor that are not in direct contact with the reaction medium also need to be heated.

U.S. Pat. No. 5,110,996 describes the preparation of vinylidene fluoride by the gaseous phase reaction of dichlorodifluoromethane with methane in a heated reactor. The reactor was filled with a non-metallic filler. A metallic hull that is heated from the exterior by electromagnetic induction surrounds the reaction chamber that contains this filler. The reaction chamber itself is therefore heated from the exterior, whereby the filler is likewise heated over time by radiating heat and/or thermal conductivity. A direct heating of the filler circulated by the reactants does not occur if this filler is electrically conductive, as the metallic reactor wall shields the electromagnetic fields from the induction coil.

WO 95/21126 discloses a gas phase process for preparing hydrogen cyanide from ammonia and a hydrocarbon with the aid of a metallic catalyst. The catalyst is inside the reaction chamber so that reactants circulate round the catalyst. It is heated from the exterior by electromagnetic induction with a frequency of 0.5 to 30 MHz, i.e. with a high frequency alternating field. In regard to this, this document cites the previously cited document U.S. Pat. No. 5,110,996 with the remark that normally, inductive heating is carried out in the frequency range from about 0.1 to 0.2 MHz. However, this indication is not comprised in the cited U.S. Pat. No. 5,110,996, and it is unclear what it refers to.

WO 00/38831 is concerned with controlled adsorption and desorption processes, wherein the temperature of the adsorber material is controlled by electromagnetic induction.

From the journal article, "Induktives Heizen in der organischen Synthese . . . " (Inductive heating in organic synthesis . . . ") by S. Ceylan, C. Friese, Ch. Lammel, K. Mazac and A. Kirschning, Angew. Chem 2008 (129), pp. 9083-9086, Angew. Chem int. Ed. 2008 (47), pp. 8950-8953, it is known that chemical reactions can be carried out by heating a heating medium with the help of electromagnetic induction. Some reactions are listed as examples. Oxidation reactions and their possible embodiments are not found among them.

The subject matter of the present invention is a process for carrying out an oxidation reaction for producing a target compound by heating a reaction medium comprising at least one first reactant together with oxygen or an oxygen carrier in a reactor, wherein the reaction medium is brought into contact with a solid heating medium that can be heated by electromagnetic induction and that is inside the reactor and is surrounded by the reaction medium, and said heating medium is heated by electromagnetic induction with the aid of an inductor, whereby an oxidation reaction occurs within the first reactant to form the target compound and wherein said target compound is separated from the heating medium.

The oxidation reaction is therefore started by heating and optionally maintaining a reaction medium that comprises at least a first reactant. This includes the possibility that the reaction medium, for example a liquid, is itself involved in the reaction and therefore represents a reactant. The whole of the reaction medium can therefore consist of one reactant. Further, a reactant can be dissolved or dispersed in the reaction medium, wherein the reaction medium can itself be inert or can represent for its part a reactant. Or one, two or more reactants are dissolved or dispersed in a reaction medium that is itself not changed by the oxidation reaction.

The solid heating medium is surrounded by the reaction medium. This can mean that the solid heating medium, apart from possible peripheral zones, is present within the reaction medium, e.g. when the heating medium is present in the form of particles, filings, wires, gauze, wool, packing materials etc. However, this can also mean that the reaction medium flows through the heating medium through a plurality of cavities in the heating medium, when for example the latter consists of one or more membranes, a bundle of pipes, a rolled up metal foil, frits, porous packing materials or from a foam. In this case the heating medium is also essentially surrounded by the reaction medium, as the majority of its surface (90% or more) remains in contact with the reaction medium. In contrast to this is a reactor, whose external wall is heated by electromagnetic induction (such as for example that cited in the document U.S. Pat. No. 5,110,996), where only the inner reactor surface comes into contact with the reaction medium.

The wall of the reactor is made of a material that neither shields nor absorbs the electromagnetic alternating field produced by the inductor and therefore is itself not heated up. Consequently, metals are unsuitable. For example it can consist of plastic, glass or ceramics (such as for example silicon carbide or silicon nitride). The last mentioned is particularly suitable for reactions at high temperatures (500-600° C.) and/or under pressure. A special reactor material that can also be used for reactions under moderate pressure (up to ca. 10 bar), is polyether ether ketone (PEEK).

The above-described method has the advantage that the thermal energy for carrying out the chemical reaction is not brought into the reaction medium through surfaces such as for example the reactor walls, heating coils, heat exchange plates or the like, but rather is produced directly in the volume of the reactor. The ratio of heated surface to volume of the reaction medium can, in this case, be considerably greater than for a heating through heat transfer surfaces, as is also the case for example cited in DE 10 2005 051637 in the introduction. In addition to this, the degree of efficiency of electrical current to thermal output is improved. By switching on the inductor, the heat can be generated in the totality of the solid heating medium, which remains in contact through a very high surface with the reaction medium. Switching off the inductor very quickly suppresses any further thermal input. This permits a very targeted reaction control.

After the target compound is formed it is separated from the heating medium. In the best case, the target compound is isolated in pure form, i.e. without solvent (it can be separated by distilling off the solvent or by precipitating the target compound out of the solvent) and isolated with no more than the usual impurities. However, the target compound can also be separated from the heating medium in a mixture with reactants or as a solution in the reaction mixture and then be isolated by further working up or be transferred into another solvent, as is desired. The process is therefore suitable for the preparative manufacture of the target compound in order to be able to use these in a further step.

In contrast to this are processes, in which a chemical reaction is indeed likewise initiated by electromagnetic induction of a heating medium, but the reaction does not serve to prepare a target compound that is separated from the heating medium after the end of the reaction. An example of this is the curing of resin systems, wherein the curing reaction is initiated on particles that are dispersed in the resin system and which are heated by electromagnetic induction. In such a case the particles remain in the cured resin system and no defined target compound is isolated. The same is true for the opposite case, in which an adhesive compound is unglued again by the inductively heated particles that are present in the adhesive matrix. A chemical reaction can indeed occur in this case, but no target compound is isolated.

The heating medium consists of an electrically conductive and/or magnetizable material that is heated by the action of an alternating electrical field. It is preferably selected from materials that possess a very high surface to volume ratio. For example the heating medium can be selected in each case from electrically conductive filings, wires, meshes, wool, membranes, porous frits, pipe bundles (of three or more pipes), rolled up metal foils, foams, packing materials such as for example granules or pellets, Raschig rings and particularly particles that preferably have an average diameter of not more than 1 mm. For example, mixed metallic elements can be employed as the heating medium, as are used for static mixers. In order to be heatable by electromagnetic induction, the heating medium is electrically conductive, for example metallic (wherein it can be diamagnetic) or it exhibits enhanced interaction towards diamagnetism with a magnetic field and in particular is ferromagnetic, ferrimagnetic, paramagnetic or super-paramagnetic. In this regard it is immaterial whether the heating medium is of an organic or inorganic nature or whether it contains both inorganic as well as organic components.

In a preferred embodiment, the heating medium is selected from particles of electrically conductive and/or magnetizable solids, wherein the mean particle size of the particles is from 1 to 1000, especially from 10 to 500 nm. The mean particle size and when necessary also the particle size distribution can be determined for example by light scattering. Magnetic particles are preferably selected, for example ferromagnetic or super-paramagnetic particles, which exhibit the lowest possible remanence or residual magnetism. This has the advantage that the particles do not adhere to each other. The magnetic particles can be in the form of "ferrofluids", i.e. liquids, in which nanoscale ferromagnetic particles are dispersed. The liquid phase of the ferrofluid can then serve as the reaction medium.

Magnetizable particles, in particular ferromagnetic particles, which exhibit the desired properties, are known from the prior art and are commercially available. The commercially available ferrofluids may be cited as an example. Examples for the manufacture of magnetic nano-particles, which can be used in the context of the inventive process, can be found in the article by Lu, Salabas and Schüth: "Magnetische nano-Partikel: Synthese, Stabilisierung, Funktionalisierung and Anwendung", Angew. Chem. 2007, 119, pp. 1242 to 1266.

Suitable nano-particles with different compositions and phases are known. The following examples may be cited: pure metals such as Fe, Co and Ni, oxides such as $Fe_3O_4$ and gamma-$Fe_2O_3$, spinel type ferromagnets such as $MgFe_2O_4$, $MnFe_2O_4$ and $CoFe_2O_4$ as well as alloys such as $CoPt_3$ and FePt. The magnetic nano-particles can be of a homogeneous structure or can possess a core-shell structure. In the latter case the core and shell can consist of different ferromagnetic or also antiferromagnetic materials. However, embodiments are also possible, in which a magnetizable core that can be for example ferromagnetic, antiferromagnetic, paramagnetic or super-paramagnetic, is surrounded by a non-magnetic material. An organic polymer for example, can represent this material. Or the shell consists of an inorganic material such as for example silica or $SiO_2$. A coating of this type can prevent a chemical interaction between the reaction medium or the reactants with the material of the magnetic particle itself. In addition, the shell material can be surface modified, without the material of the magnetizable core interacting with the functionalizing entity. In this regard, a plurality of particles of the core material can be enclosed together into a shell of this type.

Nano-scale particles of super-paramagnetic substances for example can be employed as the heating medium and are selected from aluminum, cobalt, iron, nickel or their alloys, metal oxides of the type n-maghemite (gamma-$Fe_2O_3$), n-magnetite ($Fe_3O_4$) or ferrites of the type $MeFe_2O_4$, wherein Me is a divalent metal selected from manganese, copper, zinc, cobalt, nickel, magnesium, calcium or cadmium. Preferably the mean particle size of these particles is ≤100 nm, preferably ≤=51 nm and particularly preferably ≤30 nm.

An exemplary suitable material is available from Evonik (formally Degussa) under the name MagSilica™. In this material, iron oxide particles having a size between 5 and 30 nm are embedded in an amorphous silica matrix. Such iron oxide-silicon dioxide composite particles, which are described in more detail in the German patent application DE 101 40 089, are particularly suitable.

These particles can comprise super-paramagnetic iron oxide domains with a diameter of 3 to 20 nm. This is understood to mean super-paramagnetic regions that are spatially separated from one another. The iron oxide can be present in these domains in a single modification or in various modifications. A particularly preferred super-paramagnetic iron oxide domain is gamma-$Fe_2O_3$, $Fe_3O_4$ and mixtures thereof.

The content of the super-paramagnetic iron oxide domains of these particles can be between 1 and 99.6 wt. %. The individual domains are separated from one another and/or surrounded by a non-magnetizable silicon dioxide matrix. The region containing a content of the super-paramagnetic iron oxide domains is preferably >30 wt. %, particularly preferably >50 wt. %. The achievable magnetic effect of the inventive particle also increases with the content of the super-paramagnetic regions. The silicon dioxide matrix also stabilizes the oxidation level of the domain in addition to separating the spatial separation of the super-paramagnetic iron oxide domains. Thus, for example, magnetite is stabilized as the super-paramagnetic iron oxide phase by a silicon dioxide matrix. These and further properties of these particles that are particularly suitable for the present invention are listed in more detail in DE 101 40 089 and in WO 03/042315.

Furthermore, nano-scale ferrites such as those known for example from WO 03/054102 can be employed as the heating medium. These ferrites possess the composition $(M^a{}_{1-x-y}M^b{}_xFe''{}_y)Fe'''{}_2O_4$, in which
$M^a$ is selected from Mn, Co, Ni, Mg, Ca, Cu, Zn, Y and V,
$M^b$ is selected from Zn and Cd,
x stands for 0.05 to 0.95, preferably 0.01 to 0.8,
y stands for 0 to 0.95 and
the sum of x and y is maximum 1.

One embodiment of the inventive process is wherein the particles of electrically conductive and/or magnetizable solids at least partly comprise oxidic groups and act as the oxygen carrier for the oxidation reaction. For example, magnetizable metal oxides that have an oxidizing effect towards the first reactant can be used. In this case the heating medium itself thus represents the oxidizing agent (oxygen carrier). Examples for this are inductively heatable oxides such as the abovementioned ferrites of the type of the $MeFe_2O_4$ or $(M^a{}_{1-x-y}M^b{}_xFe''{}_y)Fe'''{}_2O_4$, gamma-$Fe_2O_3$, $Fe_3O_4$ and mixtures thereof.

An alternative embodiment is wherein the heating medium is selected from particles of magnetizable solids and these are present in a mixture with other particles that at least partly comprise oxidic groups and act as the oxygen carrier for the oxidation reaction. These additional particles do not themselves have to be directly heatable by electromagnetic induction. Rather they are heated and activated by direct (particle-particle contact) or indirect (by means of the reaction medium) heat transfer from the heatable particles. For this, those oxides of semimetals and metals are suitable for example, which can have a plurality of positive oxidation states when the metal or semimetal is present in the oxides in a higher oxidation state than the smallest possible positive oxidation state. Examples are: oxides of Ce(IV), Pb(IV), Sb(V), V(V), Cr(IV and higher), Mn (IV and higher), Fe(III), Co(III or IV) and Cu(II). Metal peroxides are likewise suitable, for example selenium dioxide or nickel peroxide, especially in the form of nano particles having a mean particle size, as measured by light scattering methods, of less than 100 nm.

In both alternatives the particles, as the oxidation reaction proceeds, are depleted of oxidic groups, such that the reaction would quickly come to a halt. Consequently, provision is preferably made for the particles that at least partly comprise oxidic groups and act as oxygen carriers for the oxidation reaction to be replenished with oxidic groups during or after the oxidation reaction by reaction with oxygen or an oxygen carrier. This means that oxygen or an oxygen carrier is either continually supplied into the reactor, such that the oxidic groups of the particles are immediately regenerated (such that the particles act similarly to a catalyst), or the particles are regenerated batch wise by a single or repeated, but interrupted addition of oxygen or of an oxygen carrier into the reactor. Exemplary oxygen carriers are organic peroxides or organic peracids or their anions, inorganic peracids such as for example peroxysulfuric acid or peroxydisulfuric acid or their anions, oxyacids of halides or their anions such as for example chlorates or perchlorates, or $H_2O_2$ or compounds that can split off $H_2O_2$.

Another embodiment or the present invention consists in that the reactor does not comprise any particles that at least in part comprise oxidic groups, but rather that the reaction medium itself comprises oxygen. This can be achieved for example by introducing the oxygen in dissolved form and/or in the form of the finest possible bubbles (for example by supplying through a frit) into the reaction medium. This is preferably continuous such that a continuous reaction is possible. However, the introduction of oxygen can be carried out batch wise. In this embodiment it can be advantageous to carry out the oxidation reaction under pressure. Accordingly, a variant of this embodiment consists in that the reactor is designed as a pressure reactor and the chemical reaction is carried out at a pressure greater than atmospheric pressure, preferably under at least 1.5 bar. Pressures higher than 20 bar should not be required in practice, but are not excluded.

In the context of this invention, the term "oxygen" can mean pure oxygen or an oxygen-containing gas, in the simplest case, air.

However, another reactant can act as the oxidizing agent (oxygen carrier), which is itself reduced in the oxidation reaction. Exemplary oxygen carriers for this embodiment are also: organic peroxides or organic peracids or their anions, inorganic peracids such as for example peroxysulfuric acid or peroxydisulfuric acid or their anions, oxyacids of halides or their anions such as for example chlorates or perchlorates, or $H_2O_2$ or compounds that can split off $H_2O_2$.

Another embodiment of the inventive process is wherein the solid heating medium is surface coated with a substance that is catalytically active for the oxidation reaction. For example it can be a layer of metal oxides that easily change their oxidation state by taking up and giving off oxygen. The abovementioned metal oxides for example can be considered for this. They can be fixed on a polar silica gel layer that encapsulates the inductively heatable metallic compound, such as for example as is the case for the heating material MagSilica™ mentioned above. On the other hand the heating material can be furnished on the surface with ion exchange groups, such as for example —$SO_3^-$ or —$NR_3^+$, which can bond through ion exchange cations or anions having oxidizing properties, for example $RuO_4^-$, $OsO_4^{2-}$, $MnO_4^-$, $IO_4^-$, $ClO_4^-$, $ClO_2^-$, $ClO^-$. These oxidizing metal oxides, cations or anions can act stoichiometrically as the oxidizing agent. They act in the sense of a catalyst only then, if after their reduction, they are reconverted by oxygen or oxygen carriers in the reaction medium, such that they once more become available as oxidizing agents.

Other examples of oxidizing agents are the Dess-Martin periodinane or tetramethylpyridinium oxide ("TEMPO"). If they are provided with OH groups, they can be fixed, optionally through a linker, onto polar carriers such as for example the silica gel layer of MagSilica™. The molecular formulas of these compounds are:

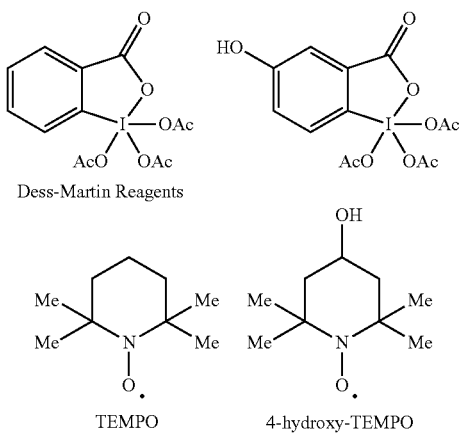

In principle the chemical reaction can be carried out in a continuous or batch manner. If the reaction is carried out in a batch mode, then the reactive medium and the inductively heated solid heating medium preferably move relative to one another during the reaction. When using a particulate heating medium this can be effected in particular by stirring the reaction mixture together with the heating medium or by swirling the heating medium in the reaction medium. If for example meshes or wool are used in a filiform shaped heating medium, then the reaction vessel that contains the reaction medium and the heating medium can be shaken.

A preferred embodiment of a batch mode reaction consists in the reaction medium being present together with particles of the heating medium in a reaction vessel, and is moved with the help of a moving element located in the reaction medium, wherein the moving element is arranged as the inductor, by which the particles of the heating medium are heated by electromagnetic induction. Consequently, in this embodiment the inductor is found inside the reaction medium. The moving element can be designed for example as a stirrer or as a plunger that moves back and forth.

Provision for externally cooling the reactor during the chemical reaction can also be made. This is possible in particular for batch modes if, as described above, the inductor is immersed in the reaction medium. The supply of the electromagnetic alternating field into the reactor is then not impeded by the cooling apparatus.

The reactor can be cooled from inside by cooling coils or heat exchangers or preferably from outside. Optionally precooled water or even a coolant for example whose temperature is below 0° C. can be used for cooling. Exemplary coolants of this type are ice-table salt mixtures, methanol/dry ice or liquid nitrogen. The cooling creates a temperature gradient between the reactor wall and the inductively heated heating medium. This is particularly pronounced when a coolant with a temperature significantly below 0° C. is used, for example methanol/dry ice or liquid nitrogen. The reaction medium that is heated by the inductively heated heating medium is then externally cooled down again. In this case the chemical reaction of the reactants then only occurs when it is in contact with the heating medium or is at least in its direct proximity. Due to the relative movement of the reaction medium to the heating medium, products formed during the reaction rapidly reach cooler regions of the reaction medium, such that their subsequent thermal reaction is inhibited. In this way, a desired reaction path can be kinetically selected when a plurality of possible reaction paths of the reactant(s) exist.

In an alternative embodiment the chemical reaction is carried out continuously in a flow-through reactor that is at least partially filled with the solid heating medium and thereby possesses at least one heating zone that can be heated by electromagnetic induction, wherein the reaction medium flows continuously through the flow-through reactor and wherein the inductor is located outside the reactor. Here the reaction medium flows round the heating medium, e.g. when this is in the form of particles, filings, wires, meshes, wool, packing materials etc. Or the reaction medium flows through the heating medium through a plurality of cavities in the heating medium, when this consists for example of one or a plurality of membranes, frits, porous packing materials or a foam.

The flow-through reactor is preferably designed as a tubular reactor. In this case the inductor can totally or at least partially surround the reactor. The electromagnetic alternating field generated by the inductor is then fed into the reactor from all sides or at least from a plurality of places.

"Continuously" is hereby understood to mean as usual a reaction mode, in which the reaction medium flows through the reactor in at least such a period of time that a total volume of reaction medium that is large in comparison with the internal volume of the reactor itself has flowed through the reactor, before the flow of reaction medium is discontinued. "Large" in this context means: "at least twice as large". Naturally, a continuously operated reaction of this type also has a beginning and an end.

In this continuous process in a flow-through reactor it is possible for the reactor to have a plurality of heating zones. The different heating zones can be heated differently for example. This can be the result of arranging different heating media in the flow-through reactor or due to differently mounted inductors along the reactor.

In this way the reaction medium can for example be merely warmed up, whereas the actual oxidation reaction takes place in the second heating zone. Or the oxidation reaction takes place in the first heating zone, while a secondary reaction proceeds in the second heating zone.

In another embodiment with two heating zones, both heating zones comprise a suitable substance as the oxidizing agent, which in the oxidizing form can oxidize the provided reactants at a first temperature, whereas the reduced form is reconverted into the oxidizing form by reacting with oxygen in the reaction medium at a second temperature. By varying the respective temperature in both of the heating zones, the oxidation of the reactant can occur at a first temperature with concomitant reduction of the oxidizing agent, while the reduced oxidizing agent is converted back into the oxidizing form by reaction with oxygen or an oxygen carrier at a second temperature in the other heating zone. Reduction and oxidation of the oxidizing agent can then occur alternately in the individual heating zones by switching from the first temperature to the second temperature. This leads to a quasi-continuous mode of operation, although reduction and oxidation of the oxidizing agent occurs batch wise.

In analogy to the preceding process methodology, one can also proceed as follows: two reactors with oxidizing agents are run in parallel. The first is used for the oxidation, while the second is regenerated. The second is then switched over and the first is regenerated and so on. This likewise enables a continuous operating mode to be achieved.

The solvent or the reaction medium can also be initially preheated in a conventional manner prior to its contacting the heating medium in the reaction.

When required, a cooling zone, for example in the form of a cooling jacket around the reactor, can be provided after the (last) heating zone.

Furthermore, after leaving the heating zones the reaction medium can be brought into contact with an absorbing substance that removes by-products or impurities from the reaction medium. For example it can be a molecular sieve, through which flows the reaction medium after having left the heating zones. In this way the product can be purified immediately after its production.

Depending on the chemical reaction rate, the product yield can optionally be increased by at least partially recycling the reaction medium that has flowed through the solid heating medium back through the solid heating medium again. In this way the impurities, by-products or even the desired major product can be removed from the reaction medium after each passage through the solid heating medium. The various known separation methods are suitable for this, for example absorption on an absorbing substance, separation through a membrane process, precipitation by cooling or separation by distillation. This ultimately enables a complete conversion of the reactant(s) to be achieved.

The required total contact time of the reaction medium with the inductively heated heating medium needs to be chosen as a function of the kinetics of each chemical reaction. The slower the desired oxidation reaction, the longer will be the chosen contact time. This has to be empirically adjusted for each individual case. As a guide, the reaction medium preferably flows once or a plurality of times through the flow-through reactor with a speed such that the total contact time of the reaction medium with the inductively heated heating medium is in the range of one second to 2 hours prior to separating the target product. Shorter contact times are conceivable but more difficult to control. Longer contact times can be required for particularly slow chemical reactions, but increasingly worsen the economics of the process.

The inventive process is preferably carried out in such a way that the reaction medium in the reactor is in liquid form under the set reaction conditions (particularly temperature and pressure). This generally makes possible, based on the reactor volume, better space-time yields than for gas phase reactions.

It goes without saying that the nature of the heating medium and the design of the inductor have to be matched to each other in such a way that permits the reaction medium to be heated up. A critical variable for this is firstly the rated power of the inductor in watts as well as the frequency of the alternating field generated by the inductor. In principle, the greater the mass of the heating medium to be inductively heated, the higher will be the chosen power. In practice, the achievable power is limited primarily by the ability to cool the generator required for supplying the inductor.

Particularly suitable inductors generate an alternating field with a frequency in the range of about 1 to about 100 kHz, preferably from 10 to 80 kHz and particularly preferably from about 10 to about 30 kHz, especially up to 30 kHz. Inductors of this type together with the associated generators are commercially available, for example from IFF GmbH in Ismaning (Germany).

Thus the inductive heating is preferably carried out with an alternating field in the medium frequency range. This has the advantage, when compared with an excitation with higher frequencies, for example with those in the high frequency range (frequencies above 0.5, especially above 1 MHz), that the energy input into the heating medium can be better controlled. This is particularly true when the reaction medium is in liquid form under the reaction conditions. Consequently, in the context of the present invention the reaction medium is preferably in liquid form and inductors are employed that generate an alternating field in the abovementioned medium frequency range. This permits an economic and well controllable reaction process.

The following, for example, can be used as the heating medium:
a) MagSilica® 58/85 from Evonik (formerly Degussa),
b) Manganese ferrite powder from SusTech GmbH, Darmstadt,
c) Bayferrox®318 M: synthetic alpha-$Fe_3O_4$ from Harold Scholz & Co. GmbH,
d) Manganese-zinc-ferrite, surface coated with oleic acid, ferrite content 51.7 wt. %, SusTech GmbH, Darmstadt
e) spheres or other molded articles, coiled up sheets, turnings, coiled up meshes or wool made of metal.
f) $Fe_2O_3$, especially in the form of nano particles with a particle size in the range of 20 to 200 nm or $Fe_3O_4$, especially in the form of nano particles with a particle size in the range of 20 to 200 nm (each available from DKSH GmbH, Germany),
g) steel spheres, for example ball bearings, preferably with a diameter of maximum 1 mm, e.g. between 0.5 and 1 mm.

In a special embodiment of the inventive process, the heating medium is ferromagnetic and exhibits a Curie temperature in the range of about 40° C. to about 250° C., and is selected such that the Curie temperature does not differ by more than 20° C., preferably by not more than 10° C., from the selected reaction temperature. This affords an inherent protection against an unintended overheating. The heating medium can be heated by electromagnetic induction only up to its Curie temperature; it will not be heated any further above this temperature by the electromagnetic alternating field. Even with a malfunction of the inductor, the temperature of the reaction medium is prevented from any unintentional increase to a value significantly above the Curie temperature of the heating medium. Should the temperature of the heating medium fall below its Curie temperature then it will again be heated by electromagnetic induction. This leads to a self-regulation of the temperature of the heating medium in the region of the Curie temperature.

Oxygen or an oxygen carrier is consequently added as the oxidizing agent. At least one of the following reactions, for example, can occur as the oxidation reaction. These can be accompanied by a cleavage of a carbon-carbon bond, by a reduction of the bond multiplicity of a carbon-carbon multiple bond or by a cleavage of hydrogen in the form of water from an E-H group, wherein the element E can be selected for example from B, C, Si, N, P, O, S:

formation of a C—O single bond, for example the synthesis of alcohols from hydrocarbons and of epoxides from unsaturated hydrocarbons, formation of a C=O double bond, for example formation of aldehydes from primary alcohols, formation of ketones from secondary alcohols or from hydrocarbons, formation of carboxylic acids from primary alcohols or from aldehydes, cleavage of hydrogen as water, which can result simultaneously with the other reactions cited here (e.g. formation of nitriles from amines, dehydrogenation under the formation of C=C double bonds, oxidation of a boron, nitrogen, sulfur, selenium or phosphorus atom, for example the formation of oxygen-containing compounds from boranes, amines, thiols or phosphanes, or for example the oxidation of nitroso compounds to nitro compounds, of phosphonic acids to phosphonic acids, of sulfinic acids to sulfonic acids, or the oxidation of organic sulphides or selenides to the corresponding oxidized compounds, for example sulfoxides or selenoxides.

EXAMPLES

The following examples exemplify oxidation reactions on a laboratory scale that were carried out with the inventive process in a flow-through reactor. The present invention is of course not limited to these.

Glass tubes with a length of 12 cm and an internal diameter of 8.5 mm were used as the tubular reactor. The tubes were provided with screw connections on both ends so as to be able to attach the HPLC and suitable tubing. After having filled the reactor, the free internal volume for the fluid was 4 ml. For experiments under pressure (example group B and example 4 of the example group C), a PEEK (polyether ether ketone) reactor having the same dimensions was used and was equipped with a reaction pressure regulator. In the following reaction schemes the reactor in the inductor is indicated with the designated graphic symbol "1".

The inductor had the following performance characteristics: inductivity: 134 μHenry, winding count for the spool:= 2·16, cross sectional area=2.8 mm² (the cross sectional area results from the number of the conductor wires in the inductor and their diameter.) The diameter of the gap for receiving the tubular reactor was 12 mm. For all experiments the inductor was operated with a frequency of 25 kHz.

In the experiments the specified frequency of 25 kHz was left constant and the heating control was undertaken solely through the PWM (PWM=on/off switch for a square wave signal at a fixed fundamental frequency). In addition, the PWM is given in ‰ and/or the achieved reaction temperatures in ° C. The induced temperature was measured with a thermocouple and an infrared thermometer. The thermocouple was mounted directly behind the reactor in the fluid so as to permit an accurate as possible measurement. However, due to the metallic components of the thermocouple, a minimum distance of 4 cm had to be observed. A laser infrared thermometer with close focus optics was used for the second temperature measurement. The measurement point had a diameter of 1 mm. With this method the surface temperature of the reactor should be measured in order to obtain a second measurement point for the temperature determination. The emission factor of the material is an important constant for an infrared measurement. It is a measure of the heat emission. An emission factor of 0.85 was used and corresponds to that of an average glass.

For the example groups A and B, particles of $CrO_2$ were employed as the oxygen carrier; they can be obtained by heating Cr(III) oxide at 300° C. in an oxygen atmosphere for 2 hours. The length and diameter of the particles were approx. 0.3 μm and approx. 0.03 μm respectively. The surface area determined by BET (nitrogen) was approx. 30 m²/g. A commercial product is available under the name MagTrieve™ These particles are themselves not heatable by electromagnetic induction. They were therefore employed as the heating medium in a mixture with manganese ferrite powder (reaction example A1) and in a mixture with MagSilica™ (each in the volume ratio 1:1) for the other reaction examples.

For the example group C, particles of $NiO_2$ (nickel peroxide) mixed with MagSilica™ (each in the volume ratio 1:1) as the heating medium.

For each reaction the reactor, charged with the oxidizing agent and the heating medium was inserted into the inductor and connected on the inlet side with a pump, on the outlet side with a collection vessel. Initially, toluene was pumped through the reactor until constant flow conditions were obtained. The reaction temperature was then adjusted by regulating the power of the inductor. Once a constant temperature was reached the reaction solution was fed through the reactor. The reaction temperatures and the flow rates as well as the isolated yields are given for the individual examples (yields after distilling off the solvent under vacuum and downstream processing of the residue by flash chromatography ($SiO_2$, ethyl acetate/petroleum ether). The products were identified from their $^1H$ nuclear magnetic resonance spectra and further analytical literature data. The listed yields were each obtained with a single pass of the reactants.

Reaction Examples Group A:

The starting products were introduced as a solution in toluene (0.15 molar).

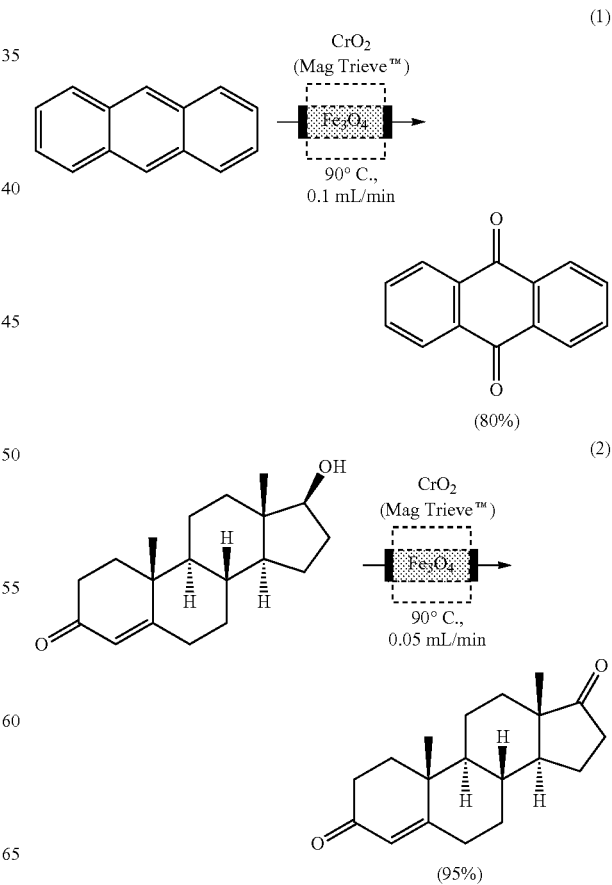

-continued

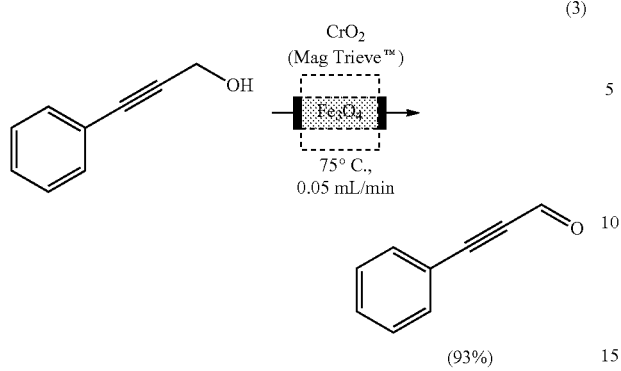

(3)

(93%)

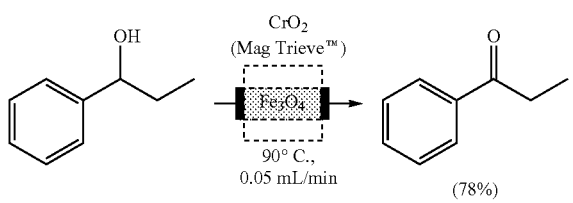

(4)

(78%)

Comparative: For preparing the target products in the batch process, the following yields were obtained:
Product 3: 46% after 7 hours,
Product 5: 95% after 22 hours,
Product 7: 62% after 7 hours,
Product 9: 95% after 7 hours.
Furthermore, the downstream processing (product separation from the heating medium and oxidizing agent) in the inventive process is considerably easier, as the filtration and washing steps are obviated. This applies to all reaction examples.

Reaction Examples Group B:

These reactions were carried out in the PEEK reactor under pressure (reaction pressure ca. 6.9 bar). Staring product 10 was 0.15 molar dissolved in MeCN, starting product 12 was 0.12 molar in toluene.

High Pressure/High Temperature Oxidations in Flow Conditions

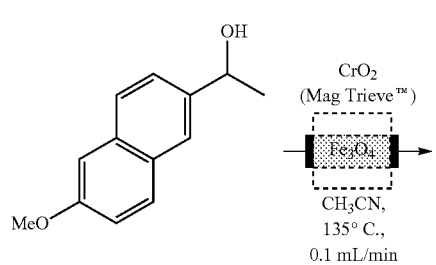

(1)

(92%)

-continued

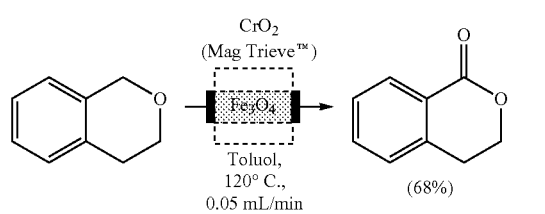

(2)

(68%)

Comparative: When preparing the target products in the batch process, the following yields were obtained:
Product 11: 57% after 7 hours at 90° C.,
Product 13: 51% after 7 hours at 90° C., Reaction Examples Group C:

Reactions involving nickel peroxide as the oxidizing agent. Reactions 1-3: glass reactor under normal pressure, starting product 0.15 molar in toluene, reaction 4 under 6.9 bar reaction pressure in the PEEK reactor, starting product 0.125 molar in toluene.

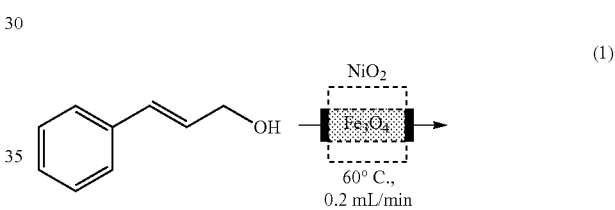

(1)

(78%)

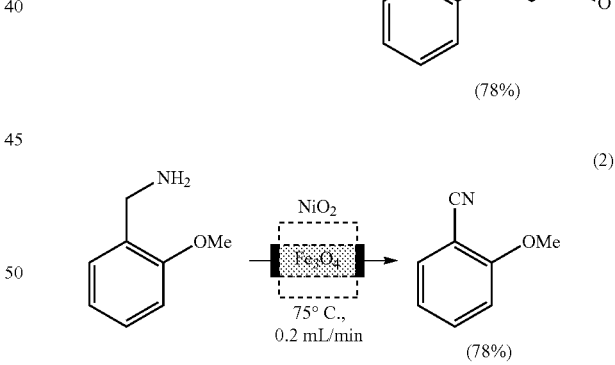

(2)

(78%)

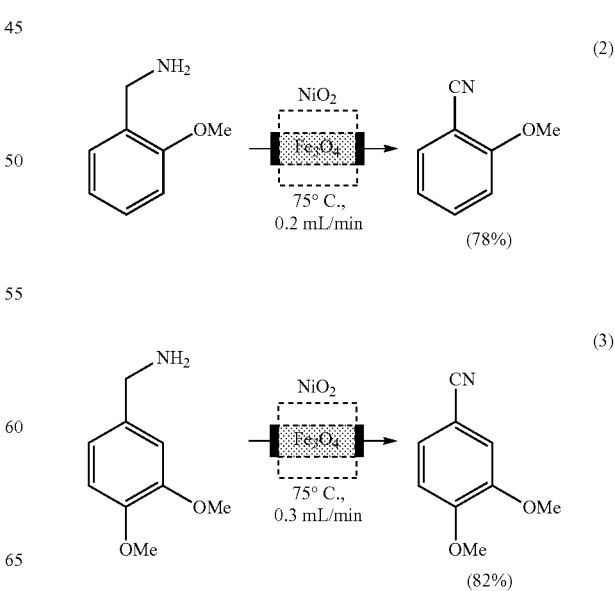

(3)

(82%)

High Pressure/High Temperature Oxidations in Flow Conditions

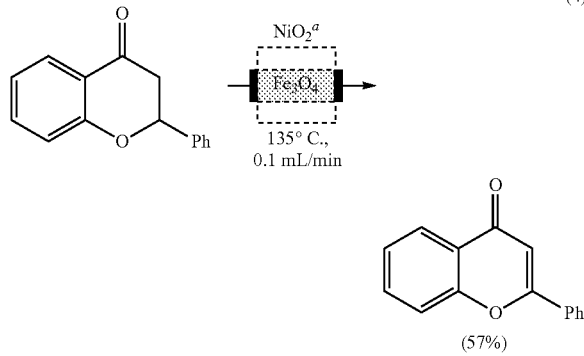

(57%)

Comparative: When preparing the target products in the batch process, the following yields were obtained:
Product 15: 72% after 2 hours,
Product 17: 72% after 6 hours,
Product 19: 70% after 4 hours,
Product 21: 42% after 24 hours.

The invention claimed is:

1. A process for carrying out an oxidation reaction for producing a target compound by heating a reaction medium comprising at least one first reactant together with oxygen or an oxygen carrier in a reactor, wherein the reaction medium is brought into contact with a solid heating medium that can be heated by electromagnetic induction and that is inside the reactor and is surrounded by the reaction medium, and said heating medium is heated by electromagnetic induction with the aid of an inductor, whereby an oxidation reaction occurs within the first reactant to form the target compound and wherein said target compound is separated from the heating medium, wherein the reaction medium is present in the reactor as a liquid and the heating medium is selected from particles of electrically conductive and/or magnetizable solids, wherein:
the particles of electrically conductive and/or magnetizable solids at least partly comprise oxidic groups and act as the oxygen carrier for the oxidation reaction; or
the particles of electrically conductive and/or magnetizable solids are present in a mixture with other particles that at least partly comprise oxidic groups and act as the oxygen carrier for the oxidation reaction; and
wherein as the oxidation reaction proceeds the particles are depleted of oxidic groups.

2. The process according to claim 1, wherein the heating medium is selected from particles of electrically conductive and/or magnetizable solids, wherein the mean particle size of the particles is between 1 and 1000 nm.

3. The process according to claim 2, wherein the heating medium is selected from particles of electrically conductive and/or magnetizable solids, wherein each particle comprises at least one core of an electrically conductive and/or magnetizable material that is encapsulated by a non-magnetic material.

4. The process according to claim 1, wherein the heating medium is ferromagnetic and exhibits a Curie temperature in the range of about 40° C. to about 250° C., and is selected such that the Curie temperature does not differ by more than 20° C., from a selected oxidation reaction temperature.

5. The process according to claim 2, wherein the particles of electrically conductive and/or magnetizable solids are magnetizable solids and are present in a mixture with other particles that at least partly comprise oxidic groups which act as the oxygen carrier for the oxidation reaction.

6. The process according to claim 5, wherein the particles that at least partly comprise oxidic groups and act as oxygen carriers for the oxidation reaction are provided with oxidic groups during or after the oxidation reaction by reaction with oxygen or an oxygen carrier.

7. The process according to claim 2, wherein said other particles that at least partly comprise oxidic groups and act as the oxygen carrier for the oxidation reaction are selected from the group consisting of Ce(IV) oxide, Pb(IV) oxide, Sb(V) oxide, V(V) oxide, Cr(IV and higher) oxide, Mn (IV and higher) oxide, Co(III or IV) oxide, Cu(II) oxide, selenium dioxide, nickel peroxide and combinations thereof.

8. The process according to claim 7, wherein said other particles are selected from chromium oxide and nickel peroxide.

9. The process according to claim 1, wherein the solid heating medium is surface covered with a substance that is catalytically active for the oxidation reaction.

10. The process according to according to claim 1, wherein the oxidation reaction is carried out in a flow-through reactor that is at least partially filled with the solid heating medium and thereby possesses at least one heating zone that can be heated by electromagnetic induction, wherein the reaction medium flows through the flow-through reactor and wherein the inductor is located outside the reactor.

11. The process according to claim 10, wherein the reaction medium flows once or a plurality of times through the flow-through reactor with a speed such that total contact time of the reaction medium with the heating medium is in a range of one second to 2 hours.

12. The process according to claim 1, wherein the inductor generates an alternating field with a frequency in a range of 1 to 100 kHz.

13. The process according to claim 1, wherein in the oxidation reaction at least one reaction occurs which is selected from: formation of a C—O single bond, formation of a C═O double bond, cleavage of hydrogen as water, oxidation of a boron, nitrogen, sulfur, selenium or phosphorus atom.

14. The process according to claim 3, wherein the particles of electrically conductive and/or magnetizable solids at least partly comprise oxidic groups and act as the oxygen carrier for the oxidation reaction.

15. The process according to claim 3, wherein the heating medium is selected from particles of magnetizable solids and these are present in a mixture with other particles that at least partly comprise oxidic groups and act as the oxygen carrier for the oxidation reaction.

16. A process for carrying out an oxidation reaction for producing a target compound comprising:
heating in a reactor a reaction medium comprising at least one first reactant together with at least one of pure oxygen, an oxygen-containing gas or an oxygen carrier selected from organic peroxides, anions of organic peroxides, organic peracids, anions of organic peracids, inorganic peracids, anions of inorganic peracids, $H_2O_2$, compounds that split off $H_2O_2$ and combinations thereof;
wherein the reaction medium is brought into contact with a solid heating medium that can be heated by electromagnetic induction and that is inside the reactor and is surrounded by the reaction medium, and said heating medium is heated by electromagnetic induction with the aid of an inductor, whereby an oxidation reaction occurs within the first reactant to form the target compound and wherein said target compound is separated from the heating medium, wherein the reaction medium is present in the reactor as a liquid.

17. The process according to claim 16, wherein the reaction medium comprises pure oxygen or an oxygen-containing gas that is used for the oxidation reaction.

18. The process according to claim 16, wherein the reaction medium comprises pure oxygen or an oxygen-containing gas that is used for the oxidation reaction.

19. The process according to claim 16, wherein the reactor is a pressure reactor and the chemical reaction is carried out at a pressure greater than atmospheric pressure.

* * * * *